US008740145B2

(12) United States Patent
Wesselink et al.

(10) Patent No.: US 8,740,145 B2
(45) Date of Patent: Jun. 3, 2014

(54) DOOR FOR AN ACCOMMODATION MODULE, ACCOMMODATION MODULE AND AIRCRAFT

(75) Inventors: Christian Wesselink, Hamburg (DE); Jovan Ulbrich-Gasparevic, Pinneberg (DE)

(73) Assignee: Airbus Operations GmbH (DE)

( * ) Notice: Subject to any disclaimer, the term of this patent is extended or adjusted under 35 U.S.C. 154(b) by 140 days.

(21) Appl. No.: 13/545,120

(22) Filed: Jul. 10, 2012

(65) Prior Publication Data

US 2013/0015293 A1 Jan. 17, 2013

Related U.S. Application Data

(60) Provisional application No. 61/507,708, filed on Jul. 14, 2011.

(30) Foreign Application Priority Data

Jul. 14, 2011 (DE) .......................... 10 2011 107 533

(51) Int. Cl.
*B64D 11/00* (2006.01)

(52) U.S. Cl.
USPC .................... 244/118.5; 244/118.6

(58) Field of Classification Search
USPC .......................... 244/118.5, 118.6
See application file for complete search history.

(56) References Cited

U.S. PATENT DOCUMENTS 3,213,962 A * 10/1965 Clark, Jr. ........................ 182/78
3,591,979 A * 7/1971 Graber ............................... 49/70
3,955,322 A * 5/1976 Call, Jr. ............................ 49/40
4,671,563 A * 6/1987 Shakespear ................ 296/181.1
5,784,836 A * 7/1998 Ehrick ............................ 52/79.8
6,007,025 A * 12/1999 Coughren et al. .......... 244/118.6
6,152,400 A * 11/2000 Sankrithi et al. ........... 244/118.5
6,520,451 B1 * 2/2003 Moore ........................ 244/118.5
6,604,709 B1 * 8/2003 Wentland et al. .......... 244/118.5
6,761,332 B1 * 7/2004 Bengtsson .................. 244/118.5
6,834,834 B2 * 12/2004 Dazet et al. ................ 244/129.5
7,262,957 B2 * 8/2007 Doebertin et al. ........ 361/679.55
7,354,018 B2 * 4/2008 Saint-Jalmes .............. 244/118.5
7,681,837 B2 * 3/2010 Nakamura et al. ......... 244/129.4
8,162,258 B2 * 4/2012 Joannis et al. ............. 244/118.6
2001/0050519 A1 * 12/2001 Kasuya ........................ 312/315
2003/0056686 A1 * 3/2003 Morlok ........................ 105/443
2006/0284013 A1 * 12/2006 Guering ..................... 244/118.6
2007/0102579 A1 * 5/2007 Krieglsteiner et al. .... 244/129.1
2008/0302911 A1 * 12/2008 Warner et al. ............. 244/118.6
2009/0045288 A1 * 2/2009 Nakamura et al. ......... 244/129.5

(Continued)

FOREIGN PATENT DOCUMENTS

DE 8812313 U1 12/1988
DE 102005043610 A1 3/2007

(Continued)

*Primary Examiner* — Christopher P Ellis
*Assistant Examiner* — Medhat Badawi
(74) *Attorney, Agent, or Firm* — Lerner, David, Littenberg, Krumholz & Mentlik, LLP

(57) ABSTRACT

A door for crew rest compartments of cabins of means of transport comprises a lateral door leaf and a front door leaf as well as a floor element. With the door closed the floor element forms a continuation of the floor of the crew rest compartment. When compared to sliding doors, the cost of manufacture and the weight may be reduced.

12 Claims, 2 Drawing Sheets

(56) References Cited

U.S. PATENT DOCUMENTS

| | | | |
|---|---|---|---|
| 2009/0065641 A1* | 3/2009 | Koehn et al. | 244/118.5 |
| 2010/0019087 A1* | 1/2010 | Warner et al. | 244/118.6 |
| 2010/0044509 A1* | 2/2010 | Helfrich et al. | 244/118.5 |
| 2010/0140400 A1* | 6/2010 | Helfrich et al. | 244/118.6 |
| 2010/0140402 A1* | 6/2010 | Jakubec et al. | 244/118.6 |
| 2010/0301163 A1* | 12/2010 | Guering et al. | 244/118.6 |
| 2011/0057073 A1* | 3/2011 | Joannis et al. | 244/118.6 |
| 2011/0233333 A1* | 9/2011 | Papke | 244/118.6 |
| 2012/0012704 A1* | 1/2012 | Mosler et al. | 244/118.5 |
| 2012/0193472 A1* | 8/2012 | Guering et al. | 244/118.6 |

FOREIGN PATENT DOCUMENTS

| | | | | |
|---|---|---|---|---|
| DE | 102007009279 A1 | | 8/2008 | |
| DE | 102007012376 A1 | | 9/2008 | |
| DE | 102009000564 A1 | * | 12/2010 | ............ B62D 31/00 |
| WO | 20101021594 A1 | | 2/2010 | |
| WO | 2011 081 854 A2 | | 7/2011 | |

* cited by examiner

DOOR FOR AN ACCOMMODATION MODULE, ACCOMMODATION MODULE AND AIRCRAFT

CROSS-REFERENCE TO RELATED APPLICATIONS

This application claims the benefit of the filing date of U.S. Provisional Patent Application No. 61/507,708 filed Jul. 14, 2011, the disclosure of which is hereby incorporated herein by reference.

FIELD OF THE INVENTION

The invention relates to doors for accommodation modules for cabins of means of transport, and in particular to a door for an accommodation module of an aircraft cabin, to an accommodation module comprising such a door, and to an aircraft.

BACKGROUND OF THE INVENTION

At present, accommodation modules for the cabin of an aircraft, also referred to as crew rest compartments or CRCs, are installed in a host of different positions in the means of transport. In particular, such crew rest compartments are installed on board aircraft for use by the pilots or the remaining crew.

Thus, crew rest compartments are, for example, installed on the main deck or above the passenger cabin (so-called overhead crew rest compartments, OHCRCs), as well as below the main deck (so-called bulk crew rest compartments, BCRCs).

Many crew rest compartments either comprise a simple door that opens to the outside towards the cabin, or are connected to the cabin by way of a stairhouse or stairway. By way of this stairway a crew member reaches the actual region of the crew rest compartment via a hatch or some other opening and via stairs, as can be provided, for example, in the case of OHCRCs or BCRCs for long-haul flights.

DE 10 2007 009 279 A1 and DE 10 2007 012 376 A1 show crew rest compartments with stairways.

BRIEF SUMMARY OF THE INVENTION

The features mentioned below with regard to the door also represent features of the crew rest compartment and of the aircraft.

According to a first aspect of the invention, a door for a crew rest compartment for a cabin of a means of transport is stated, which means of transport is, for example, a land vehicle such as a car, bus, train or truck; a watercraft; or an aircraft, for example a helicopter, airship or an airplane. The door comprises a front door leaf and a lateral door leaf that is connected to the front door leaf at an angle other than 180 degrees. This connection can take place directly in that the two door leaves are bonded to each other, screwed to each other or are otherwise interconnected. However, the connection can also take place indirectly, for example by way of one or several corresponding intermediate elements or stiffening elements that ultimately interconnect the two door leaves.

Furthermore, according to a further embodiment of the invention, a floor element is provided that can serve as a stiffening element and a floor, which floor element is arranged on the lower regions of the door leaves, and is connected to at least one of the two door leaves. Here, too, the connection can be established directly or by way of corresponding intermediate elements.

Furthermore, a pivot bearing is provided that is provided for pivot-mounting the lateral door leaf (and thus the entire door).

This pivot bearing can, for example, be one or several hinges or other pivot bearing arrangements.

In other words the pivot axis of the door is in the region of the lateral door leaf, for example in a region of the lateral door leaf, which region is located at maximum space from the front door leaf, but not on the front door leaf.

For example, the two door leaves comprise an angle of 90 degrees to each other. Depending on the design and construction of the crew rest compartment, this angle can also comprise more or less than 90 degrees.

According to one embodiment of the invention, the floor element comprises a first straight lateral surface that is connected to the front door leaf. Furthermore, the floor element comprises a second straight lateral surface that is connected to the lateral door leaf.

For example these two lateral surfaces are connected to the corresponding door leaf over their entire lengths.

According to a further embodiment of the invention, the floor element comprises a rectangular base area.

According to a further embodiment of the invention, the front door leaf is wider than the lateral door leaf. The ratio of the width of the front door leaf to the width of the lateral door leaf can, for example, be 5:4, 4:3, 3:2 or 2:1. Other width ratios are also possible. For example, the diagonal from the pivot bearing to the outermost end of the front door leaf (in other words the distance between the pivot bearing and the outer edge of the front door leaf) comprises a length that corresponds at least to the minimum width, required by a customer and/or by the authorities, of a door opening for a corresponding standard door.

According to a further exemplary embodiment of the invention, the length of the floor element is shorter than the width of the front door leaf so that the front door leaf is not connected over its entire width to the floor element but laterally protrudes beyond said floor element.

This "protrusion" of the front door leaf can, for example, involve half, a third or a quarter of its overall width. Of course, the protrusion can also be considerably smaller, for example depending on the width of the staircase.

According to a further aspect of the invention, a crew rest compartment for a cabin of a means of transport is stated, which cabin comprises a door as described above and below.

According to a further embodiment of the invention, the door is used for opening and closing an entrance region of the crew rest compartment. In the case of an overhead crew rest compartment this so-called entrance region is situated above the base area of the crew rest compartment, namely in that location where entry stairs lead to the actual accommodation space of the crew rest compartment.

If the stiffening element is designed as part of the floor (in other words as a floor element), the crew rest compartment comprises a floor, wherein when the door is closed the floor element of the door joins so as to be flush with the floor of the crew rest compartment.

In other words when the door is closed the floor element of the door forms a continuation of the actual floor of the interior region of the crew rest compartment, preferably without any significant gaps in between and without any difference in height so that, for example, an entry opening situated below it is effectively covered, and the user can use the floor element as a continuation of the actual floor within the CRC.

According to a further embodiment of the invention, the crew rest compartment comprises a flight of stairs which leads from the passenger cabin to the entrance region of the crew rest compartment. The top step of the flight of stairs does not join the floor of the crew rest compartment so as to be flush, but instead is arranged somewhat lower so that the floor element of the door can carry out its function as a continuation of the floor of the crew rest compartment with the door closed.

According to a further embodiment of the invention, the crew rest compartment furthermore comprises a rear wall. Furthermore, of course still further sidewalls as well as a front wall can be provided. The lateral door leaf is pivotally attached, by way of the pivot bearing, to a face of the sidewall, and with the door closed is arranged laterally beside the sidewall and parallel to it. Furthermore, with the door closed the front door leaf is arranged laterally beside the rear wall and parallel to it.

In other words, with the door closed the two door leaves form continuations of the sidewall and of the rear wall.

According to a further aspect of the invention, a means of transport with a crew rest compartment described above and below is stated. The means of transport can, for example, be an aircraft, a land vehicle or a watercraft.

Below, exemplary embodiments of the invention are described with reference to the figures.

DETAILED DESCRIPTION

Figures 1A, 1B, 1C:
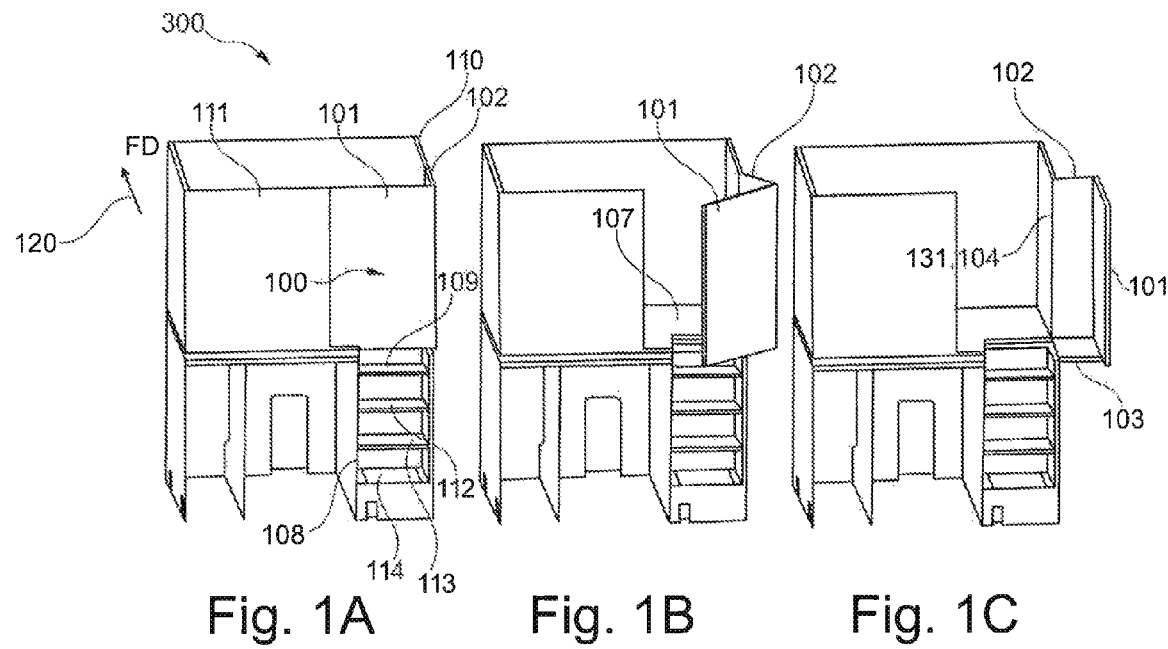
FIGS. 1A, 1B and 1C show perspective views of a crew rest compartment according to an exemplary embodiment of the invention.

The illustrations in the figures are diagrammatic and not to scale.

If in the following description of the figures in various figures identical reference characters are used, they describe identical or similar elements. However, identical or similar elements can also be designated by different reference characters.

FIGS. 1A, 1B and 1C show perspective views of a crew rest compartment 300 with a door according to an exemplary embodiment of the present invention. In FIG. 1A the door 100 is in its closed state, in FIG. 1B in its semi-open state, and in FIG. 1C in its fully-open state.

Figures 2A, 2B, 2C:
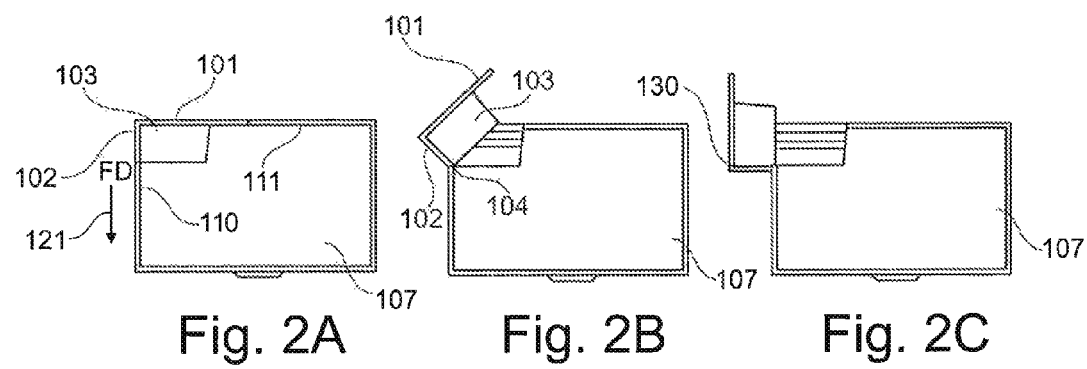
FIGS. 2A, 2B and 2C show top views of the crew rest compartment of FIGS. 1A to 3C.

FIGS. 2A, 2B and 2C show top views of the three states of FIGS. 1A, 1B and 1C.

The arrows 120, 121 indicate the direction of flight or the principal movement direction of the means of transport when the crew rest compartment is installed in the cabin of the means of transport.

Irrespective of the selection of the door type, the door of the crew rest compartment (for example an FCRC module or CCRC module for pilots and/or cabin crew) should meet the following criteria:

Cover a (relatively wide) entry opening.

Visual and acoustic separation of the CRC interior from the cabin, in particular from the adjacent galley.

Cover the staircase situated below it in cases where the actual crew rest compartment is arranged so as to be elevated and therefore is accessible only by way of a predetermined number of steps. Since the module of the crew rest compartment is to finish so as to be flush with the staircase rather than with the top step, it is necessary for the resulting horizontal gap between the top step and the front of the crew rest compartment to be covered.

During opening or in its open state the door must not protrude into the public aisles around the stairway, which aisles are also referred to as "cross aisles" or "lateral aisles", to such an extent that the door would inadmissibly impede the use of these aisles.

At the same time, if necessary, the door width should be reduced relative to the sidewall in which the door is fitted.

The door that is described in the present invention meets these criteria. Because of the simply implementable and precise pivot bearing arrangement of the door, and because of the simple but nevertheless mechanically stable design the degree of technical complexity can be kept low. Furthermore, the required installation space near the door, which installation space cannot otherwise be used, is small. Since the mechanism of the door, and in particular the bearing arrangement of the door, may be of a simple design, the construction expenditure and the design-specific expenditure can be minimized. Furthermore, it is possible, because of the relatively simple design and the clearly defined degrees of freedom with small tolerances to increase the seal of the crew rest compartment with the door closed, thus also reducing possible noise exposure from the cabin. Since no empty space is required for stowing a footboard when the door is open the door can be operated quickly.

Overall, this may result in a reduction in costs. Moreover, the weight may be reduced.

The locking mechanism may be a standard locking mechanism as is known from commonly-used single-leaf doors. Furthermore, a decompression flap in the door may be provided, which decompression flap is designed to allow rapid decompression of the cell.

As an alternative or in addition to a decompression flap, it may be provided for the door to automatically open when a predetermined pressure differential between the interior of the crew rest compartment and the exterior, in others word the cabin of the aircraft, is exceeded, in order to allow rapid pressure equalization to occur. In this case the locking mechanism of the door is designed in such a manner that it releases the door when a predetermined pressure differential is exceeded. This may take place in combination with one or several pressure sensors and an electronic control unit that controls the locking mechanism.

Furthermore, the top of the floor 107 may be arranged at a lower height level because in this region no bearing is provided. Moreover, undesirable slamming of the door may be prevented, for example by affixing a shock absorbing device that reduces the closing speed in the last phase, shortly before the lock engages.

Since only an axial bearing arrangement may have to be provided on the lateral door leaf, the effectively-useable diameter of the door may be optimized.

As is shown in FIGS. 1A to 2C, the door comprises a lateral door leaf 102 and a front door leaf 101. Moreover, a floor element 103, which is, for example, rectangular, is provided that is attached to the lateral door leaf and the front door leaf and in the closed state of the door provides an uninterrupted continuation of the floor 107 of the crew rest compartment.

The lateral door leaf 102 is rectangular in design and on one longitudinal side 130 is connected to the corresponding longitudinal side of the also rectangular front door leaf 101 (see FIG. 2C). On the opposite longitudinal side (see FIG. 1C) of the lateral door leaf the pivot bearing 104 is arranged (not shown in the figures). This is an axial bearing arrangement of the door 100, for example in the form of one or several hinges or a continuous pivot axis.

By way of the pivot bearing 104 the rear edge of the lateral door leaf is connected to the sidewall 110 of the crew rest compartment.

As is shown, in particular, in FIG. 2A, the front door leaf 101 forms a continuation of the rear wall 111 when the door is closed. Likewise, the lateral door leaf 102 forms a continuation of the sidewall 110 of the crew rest compartment when the door is closed.

When the door is closed the floor element 103 forms part of the floor 107 of the crew rest compartment, and, when the door is opened, is hinged out of the way, for example upwards, in order to uncover the flight of stairs 108 underneath it with its steps 109, 112, 113, 114. In this case the floor element is hingeably connected to the front door leaf and/or to the lateral door leaf.

It may also be possible for the floor element to be firmly connected to the front door leaf and/or to the lateral door leaf, in which case it is not designed to be hingeable. In both cases it can be provided for the floor element 103 to be freely floating when the door is closed, in other words to be held only by one door leaf or by both door leaves. In addition, it may also be possible to provide supporting surfaces in the region of the transition between the actual floor 107 and the floor element 103, on which supporting surfaces the floor element 103 rests when the door is closed.

The flight of stairs 108 can, for example, be a stand-alone flight of stairs that is not arranged in a special stairway.

Figure 3:
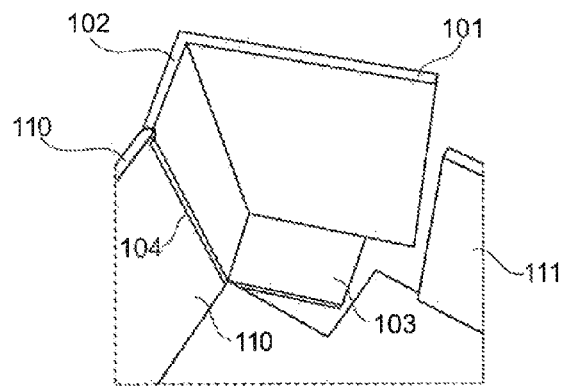
FIG. 3 shows a further view of a partial region of a crew rest compartment according to an exemplary embodiment of the invention.

FIG. 3 shows the door in its semi-open state viewed from the interior of the crew rest compartment.

The gap between the lateral door leaf 102 and the sidewall 110 can, for example, be covered by means of a corresponding cover.

Since in the floor region no bearing arrangement or guide is to be provided, the thickness of the floor 107 may be minimized.

Figure 4:
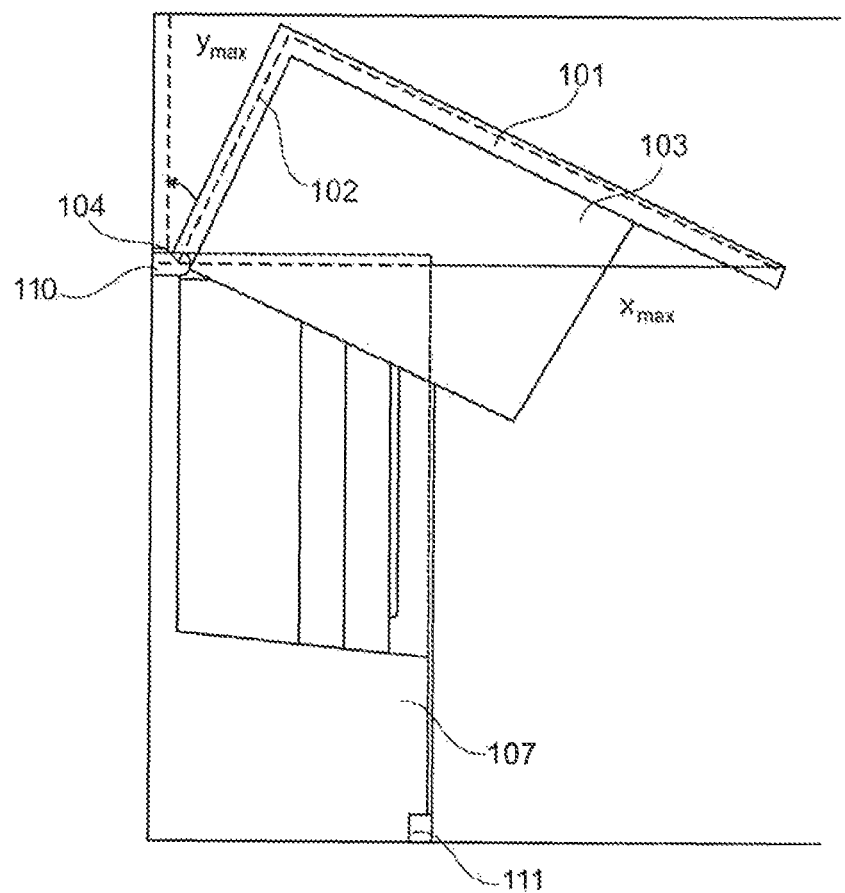
FIG. 4 shows a further view of a partial region of a crew rest compartment according to an exemplary embodiment of the invention.

As shown in FIG. 4, as a result of the position of the pivot bearing 104 (which is located at the rear edge of the lateral door leaf 102) the maximum distance ($x_{max}$), by which the door, when it is opened, protrudes into the aisle region, may be reduced. For example, $x_{max}$ is less than the aisle width of, for example, 50.8 cm (20 inches) prescribed by authorities in relation to a passenger cabin, for example approximately 39.4 cm (15.5 inches).

The distance by which the door during opening laterally protrudes into the aisle region ($Y_{max}$), is also less than 50.8 cm, for example approximately 27.9 cm (11 inches).

Figure 5:
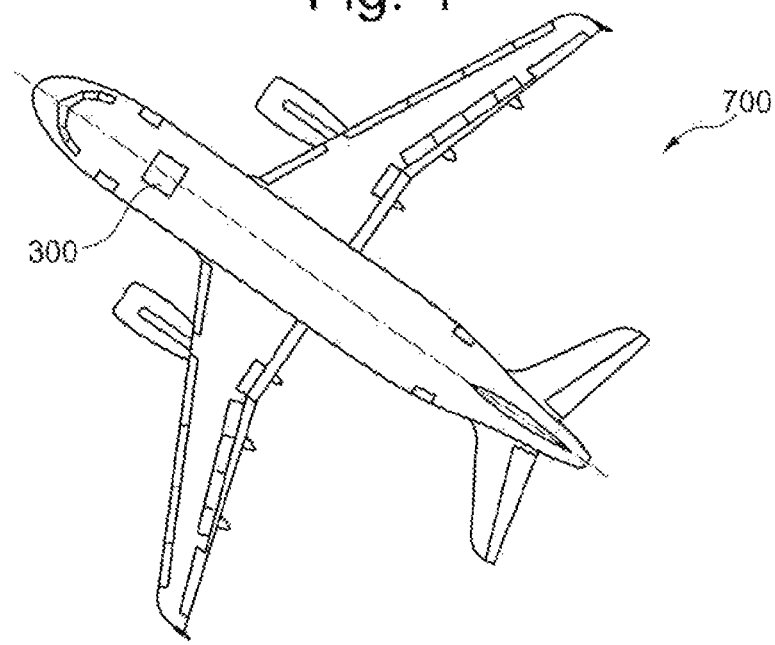
FIG. 5 shows an aircraft according to an exemplary embodiment of the invention.

FIG. 5 shows an aircraft 700 with a crew rest compartment 300 according to an exemplary embodiment of the invention.

It should be noted that the doors described above may be installed in a host of different crew rest compartments, for example in crew rest compartments for pilots, which crew rest compartments are, for example, arranged directly behind the cockpit, or in overhead crew rest compartments for cabin crew. The crew rest compartments can, for example, be arranged in the middle region of the cabin or in the rear region of the cabin of the means of transport.

In addition, it should be pointed out that "comprising" does not exclude other elements or steps, and "a" or "an" does not exclude a plural number. Furthermore, it should be pointed out that features or steps which have been described with reference to one of the above exemplary embodiments may also be used in combination with other features or steps of other exemplary embodiments described above. Reference characters in the claims are not to be interpreted as limitations.

The invention claimed is:

1. A crew rest compartment for a cabin of a means of transport, the crew rest compartment comprising:
   a door comprising:
   a front door leaf;
   a lateral door leaf connected to the front door leaf at an angle other than 180 degrees;
   a pivot bearing for pivot-mounting the lateral door leaf; and
   a stiffening element for reinforcing the connection between the front door leaf and the lateral door leaf;
   wherein the stiffening element is a floor element arranged in the lower regions of the front and lateral door leaves, and connected to at least one of the door leaves.

2. The crew rest compartment of claim 1, wherein the front door leaf and the lateral door leaf comprise an angle of 90 degrees to each other.

3. The crew rest compartment of claim 1,
   wherein the floor element comprises a first straight lateral surface connected to the front door leaf; and
   wherein the floor element comprises a second straight lateral surface connected to the lateral door leaf.

4. The crew rest compartment of claim 1, wherein the floor element comprises a rectangular base area.

5. The crew rest compartment of claim 1, wherein the front door leaf is wider than the lateral door leaf.

6. The crew rest compartment of claim 1, wherein a length of the floor element is shorter than a width of the front door leaf so that the front door leaf is not connected over its entire width to the floor element.

7. The crew rest compartment of claim 1, wherein the door is configured for opening and closing an entrance region of the crew rest compartment.

8. The crew rest compartment of claim 1, further comprising:
   a floor;
   wherein when the door is closed the floor element of the door joins so as to be flush with the floor of the crew rest compartment.

9. The crew rest compartment of claim 1, further comprising:
   a flight of stairs leading to the entrance region of the crew rest compartment;
   wherein the top step of the flight of stairs does not join the floor of the crew rest compartment so as to be flush.

10. The crew rest compartment of claim 1, further comprising:
    a sidewall;
    a rear wall;
    wherein the lateral door leaf is pivotally attached, by the pivot bearing, to the sidewall;
    wherein with the door closed the front door leaf is arranged laterally beside the rear wall and parallel to it;
    wherein with the door closed the lateral door leaf is arranged laterally beside the sidewall and parallel to it.

11. A means of transport comprising a crew rest compartment, the crew rest compartment comprising:
    a door comprising:
    a front door leaf;
    a lateral door leaf that is connected to the front door leaf at an angle other than 180 degrees;
    a pivot bearing for pivot-mounting the lateral door leaf; and a stiffening element for reinforcing the connection between the front door leaf and the lateral door leaf;

wherein the stiffening element is a floor element arranged in the lower regions of the front and lateral door leaves, and connected to at least one of the door leaves.

12. The means of transport of claim 11, wherein the means of transport comprises an aircraft.

\* \* \* \* \*